Dec. 28, 1926.  1,611,956

R. P. SMITH

BURR CUTTER

Filed Jan. 21, 1924

WITNESSES

INVENTOR
Reeves P. Smith
By Green and McCallister
His Attorneys

Patented Dec. 28, 1926.

1,611,956

UNITED STATES PATENT OFFICE.

REEVES P. SMITH, OF BETHLEHEM, PENNSYLVANIA, ASSIGNOR TO BETHLEHEM FABRICATORS, INC., A CORPORATION OF PENNSYLVANIA.

BURR CUTTER.

Application filed January 21, 1924. Serial No. 687,669.

This invention relates to cutters and more particularly to burr cutters for removing the burr formed along the line of shear of structural materials such as beams, H-columns, angles or plates.

On a structural member, such as a beam, for example, a burr or rough edge is present on the end thereof, as it comes from the mill. This burr was formed when the beam was cut to length and must be removed before the beam can be assembled with other strucural members. Heretofore this has been done by means of a cold chisel and hammer or by a pneumatic chipper.

An object of this invention is to provide a simple, rugged, and inexpensive cutter which may be easily manipulated to remove the burrs from structural materials.

Figure 1:
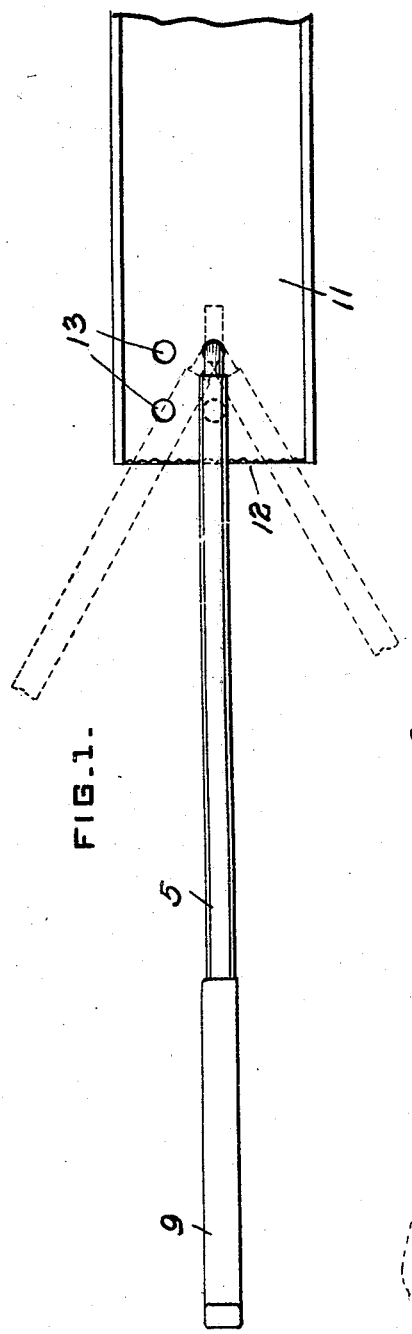
Figure 2:
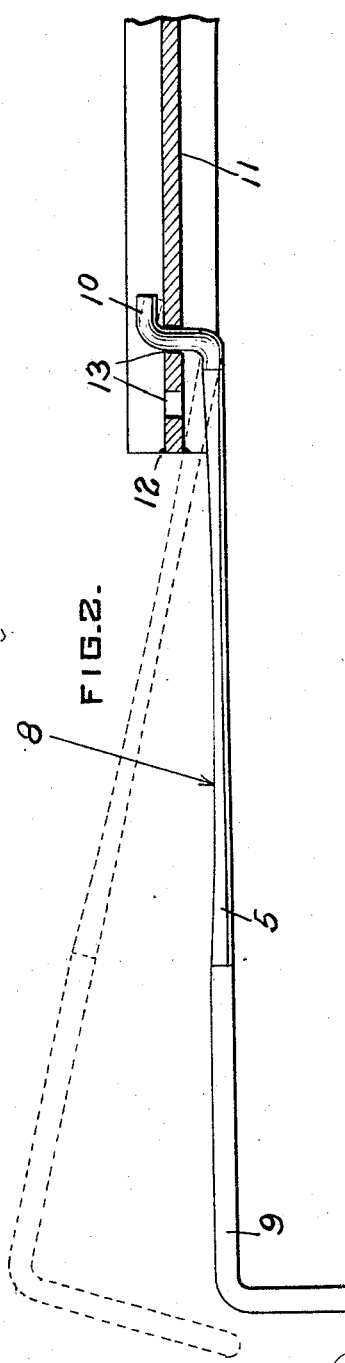
Figure 3:
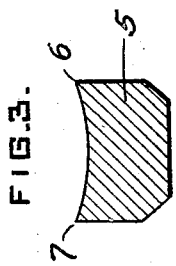

For the purpose of illustration I have shown one form of my invention in the accompanying drawings in which Figure 1 is a plan view of a cutter constructed in accordance with my invention, shown in operative relation to a beam on which it is to be used, Fig. 2 is a side elevation of the device shown in Fig. 1, showing the beam in section and Fig. 3 is a cross section of the cutting blade of the device.

A cutting blade 5, made of tool steel is hollow ground so as to provide two cutting edges 6 and 7. The blade is curved longitudinally on a radius 8 for a purpose to be hereinafter described. A handle 9 is secured to one end of the blade and an angular pivot arm 10, of generally Z-shape, is secured or formed on the opposite end of the cutting blade.

A beam 11, as it comes from the mill has a burr 12 along the cut edge thereof. The beam has holes 13 punched therein so that it may be assembled with other structural members.

To remove the burr 12 it is only necessary to insert the Z-shaped pivot arm 10 in one of the holes 13, when, by oscillating the cutting blade back and forth along the edge of the beam the burr may be quickly and easily removed. The reason for longitudinally curving the blade is to keep the smaller beams from tipping over when the burr cutter is operated. If the blade was perfectly straight the cutting force would have a tendency to overturn the beam. Curving the blade, as described, overcomes this tendency by changing the angle of the applied force, thus making it possible to work upon small beams as well as large.

I claim:

1. A cutter for removing the burr from the cut edge of a beam including a blade provided with a cutting edge, a pivot arm on one end of said blade adapted to be inserted in a perforation in the beam and a handle on the other end of said blade for moving said blade about said pivot arm and along the edge of the beam so as to remove the burr therefrom.

2. A cutter for removing the burr from the cut edge of a beam including a longitudinally curved blade provided with a cutting edge, an angular pivot arm on one end of said blade adapted to be inserted in a perforation in the beam and a handle on the other end of said blade for moving said blade about said pivot arm and along the edge of the beam so as to remove the burr therefrom.

3. A cutter for removing the burr from the cut edge of a beam including a longitudinally curved cutting blade provided with two concave cutting edges, a pivot arm on one end of said blade adapted to be inserted in a perforation in the beam and a handle on the other end of said blade for moving said blade about said pivot arm and along the edge of the beam so as to remove the burr therefrom.

4. A cutter for removing the burr from the cut edge of a beam including a blade provided with a cutting edge, a pivot arm on one end of said blade adapted to be inserted in the perforation in the beam and so shaped as to prevent withdrawal thereof from said perforation when said cutting edge engages said beam and a handle on the other end of said blade for moving said blade about said pivot arm and along the edge of the beam so as to remove the burr therefrom.

5. A cutter for removing the burr from the cut edge of a beam including a blade provided with a cutting edge, and an angular substantially Z-shaped pivot arm on one end of said blade adapted to be inserted in a perforation in the beam and a handle on the other end of said blade for moving said blade about said pivot arm and along the edge of the beam to remove the burr therefrom.

In testimony whereof, I have hereunto subscribed my name this 31st day of December, 1923.

REEVES P. SMITH.